United States Patent [19]

Browning

[11] 4,384,487
[45] May 24, 1983

[54] DYNAMICALLY RESTRAINED INERTIAL REFERENCE INSTRUMENT AND RELIABILITY SENSOR

[76] Inventor: Alva L. Browning, Santa Barbara, Calif.

[21] Appl. No.: 183,143

[22] Filed: Sep. 2, 1980

Related U.S. Application Data

[63] Continuation-in-part of Ser. No. 510,599, Sep. 30, 1974, abandoned, Ser. No. 617,713, Sep. 29, 1975, abandoned, Ser. No. 877,697, Feb. 14, 1978, abandoned, and Ser. No. 35,233, May 2, 1979, abandoned.

[51] Int. Cl.³ .................. G01P 15/08; G01V 7/00
[52] U.S. Cl. ............................. 73/382 G; 73/517 B
[58] Field of Search ............ 73/382 R, 382 G, 516 R, 73/517 R, 517 B; 308/10

[56] References Cited

U.S. PATENT DOCUMENTS

| | | | |
|---|---|---|---|
| 3,065,640 | 11/1962 | Langmuir et al. | 73/517 B |
| 3,206,987 | 9/1965 | Cunningham | 73/517 R |
| 3,370,472 | 2/1968 | Cunningham | 73/517 R |

*Primary Examiner*—James J. Gill

[57] ABSTRACT

An instrument for detecting and making use of a charged particle located in a vacuum and contained by a cubic array of electrically chargeable electrodes is programmed to have the charged particle constantly in motion. A sensing means for each of three sets of plates becomes operative when the particle reaches a preset distance from the center of the array to trigger a pulse adapted to reverse the direction of movement of the particle. The instrument is one capable of detecting and measuring acceleration along three coordinate axes and rotational translations relative to inertial space and/or a gravity reference. It is also one for static and in-motion gravity and gravity gradient measurement. There is additionally a built-in detector of comparable accuracy capable of using the same particle to detect malfunction of the instrument.

28 Claims, 11 Drawing Figures

DYNAMICALLY RESTRAINED INERTIAL REFERENCE INSTRUMENT AND RELIABILITY SENSOR

The present application is an improvement on application Ser. No. 404,297, filed Oct. 9, 1973, and now U.S. Pat. No. 3,965,753; a continuation-in-part of application Ser. No. 510,599, filed Sept. 30, 1974, now abandoned, Ser. No. 617,713, filed Sept. 29, 1975, now abandoned, Ser. No. 877,697, filed Feb. 14, 1978, now abandoned, and Ser. No. 35,233, filed May 2, 1979, now abandoned. Attention is also directed to U.S. Pat. No. 3,148,456 which is in this field of activity.

This invention relates primarily to inertial navigation and guidance and more particularly to apparatus capable of detecting and measuring acceleration along three coordinate axes and rotational translations relative to inertial space for a gravity reference. It also relates to static and inmotion gravity and gravity-gradient measurement.

Prior activity has been primarily concerned with static equilibrium and dynamic containment methods of inertial measurements, except for the disclosure of Ser. No. 510,599 which is concerned with the employment of both types of containment in the form of a field support anomalometer. The present application is directed to inertial navigation, guidance, and advanced methods of gravity-gradient measurement.

Presently available inertial navigation and guidance systems lack the precision and reliability desired for many applications, such as aircraft, space vehicle and missile navigation and guidance, including applications such as marine and aerial geophysical exploration for petroleum and natural gas and mineral resources where precise continuous information regarding velocity and position is necessary, with an accuracy on the order of tens of meters. Presently utilized inertial navigation systems do not have the capability of this degree of precision over significantly long periods of time due to the sum total of accumulative frictional affects necessitated by the mechanical restraint of the accelerometer proof masses and the gyroscope rotors incorporated in the inertial platform.

As revealed in U.S. Pat. No. 3,148,456 these inherent inertial sensing instrument error sources, combined with the necessity of mechanical gimbaling and the resultant possibilities of gyroscope tumbling and gimbal lock, make presently available inertial navigation systems only marginally useful in such demanding applications as the above-mentioned marine and aerial geophysical surveys.

Therefore, it is the object of this invention to provide a new and improved inertial navigation and guidance system having a degree of precision not heretofore attainable.

Another object of the invention is to provide a new and improved instrument which can measure acceleration along three coordinate axis and also rotational translations relative to inertial space.

Still another object of the invention is to provide a new and improved gravity-gradiometer and also a three degree-of-freedom electrodynamic accelerameter.

A further object of this invention is to provide a new and improved three degree-of-freedom electrodynamic rotational reference, together with a self-contained detector of equal degree of accuracy capable of detecting malfunction at any selected time.

Included also among the objects of the invention is to provide a new and improved device making use of electrodynamic support of proof masses and the appropriate readout required to provide usable information from such support and containment methods for various related applications.

Also included among the objects of the invention is to provide a new and improved instrument adapted to precision inertial guidance which is not only accurate to a dependable high degree, but which also is lighter in weight and consumes appreciably less power than instruments heretofore available, and consequently capable of being airborne by relatively light are carriers and vehicles for operation free of contact with the earth's surface.

Embodied in the disclosure is an instrument capable of measuring acceleration in direction and magnitude along three coordinate axes, simultaneously with rotational translations, i.e. roll, pitch, and yaw, relative to inertial space. The instrument can also be utilized in applications where only one or more parameters need to be known, rather than all six parameters simultaneously, such as acceleration along one axis and rotation about all three axes, or acceleration along all three axes without rotational information, and comparable combinations. By way of comparison, in application Ser. No. 510,599 there are two masses being intermittently restrained while the information of greatest value is obtained by comparing the velocities of the two masses, while in free fall, along the local vertical. While the critical information is being obtained, the horizontal displacement of the two falling masses is also precisely measured, which normally is an indication of instrument tilt angle to the local vertical, said information being used to torque a single axis vertical gyroscope or an equivalent device attached to the instrument and maintaining the instrument, very accurately, along the local vertical without the necessity of mounting the gradiometer on an inertial platform to perform this function. Should the instrument be mounted in conjunction with an inertial platform, the deviation angle of the free-falling mass would be an indication of the horizontal gravity-gradient so that the instrument would in effect be measuring all three components of the gravity gradient simultaneously.

By way of explanation of the present application, should one leg of the gradiometer be eliminated simultaneous measurements of acceleration would be made, rather than gradient, along all three coordinate axis during the free fall phase of the single test mass, usually a retrosphere. If the free fall trajectory of the single proof mass or retrosphere be confined to a preferred containment area, one centimeter, for example, in diameter, and the sensing mass allowed to be in a continuous state of semirandom motion or free fall within that area, while reading out changes in acceleration in direction and magnitude of the retrosphere along the three corrdinate axis using laser interferometric or similar techniques, with proper storage and comparison of such information, the procedure would provide the basis for an instrument capable of measuring accelerations along all three axis simultaneously or more correctly the vector sum of all three accelerations including the measurement of rotational translations.

This information when properly stored and integrated can supply accurate acceleration, velocity and position information for navigation and guidance purposes. Such an instrument is free from all the error sources common to conventional electromechanical inertial platforms and systems and allows the attainment of the theoretical limit for inertial measurement as the proof mass is continuously in a totally friction-free, torque-free, state of free fall, being subject only to pure inertial events. The single sensing mass, being the source of information of changes acceleration and rotational translations, is never in physical contact with any part of the instrument. The sensing mass is dynamically contained within a predetermined containment space which may vary in size between a few millimeters in diameter to a centimeter in diameter. This is accomplished by the intermittent electrical pulsing or energizing of an external cubic electrode array surrounding the predetermined containment area and utilizing either A.C. or D.C. electrical containment.

In alternating or A.C. containment, an electrically charged mass, usually small, is supported in a condition of stable equilibrium within an electrode configuration, by the application of an alternating potential to the electrodes and the generation of an electrical "well" or area of zero field which effectively holds the electrically charged mass within the electrode assembly. This effect is best described classically by Mathieus equation and is satisfactory for use in the present invention since no readout system is required and the support is completely passive.

In the present embodiment the sensing mass, rather than being continuously restrained in a static condition of stable equilibrium or restrained in its motion along a single axis, is allowed to be in a condition of free fall in any relative direction and totally unrestrained during the reading phase of the instrument. When the sensing mass or retrosphere, being in unrestrained motion during the reading phase, crosses over the boundry of the inner containment area, the surrounding cubic electrode array is energized, briefly, by A.C. or D.C. voltages so that the sensing mass or retrosphere experiences a force which reverses its direction of motion and sends it back into the containment area with some finite velocity.

An external containment electrode assembly is energized at the appropriate time by pulse, fringe counting or other readout techniques which keep the constantly moving dynamically contained retrosphere within the appropriate predetermined inner containment area. Consequently the retrosphere will not experience physical contact with any of the elements of the electrode array or move beyond the effective area of the readout sensing. Readout is temporarily suspended during this containment pulse and resumes as soon as the sensing mass is once again free moving and unrestrained within the containment area.

Readout is accomplished by laser interferometry along all three axes, using the sensing mass as a spherical retroreflector. This is best accomplished by three Michelson interferometers or the equivalent, being arranged along the three coordinate axes, using a single continuous laser as the illumination source. Obviously the actual direction or velocity that the retrosphere assumes when it is kicked back into the inner containment area is unimportant insofar as the function of the instrument is concerned. The primary concern is that it be totally free from restraint of any kind, including magnetic and electrical effects, such as "patch" and "image" effects. Magnetic shielding is easily accomplished and external electrical field effects upon the electrically charged retrosphere are eliminated by connecting all six electrodes of the containment assembly together during each "reading" phase to form the equivalent of a Faraday cage.

The sensing mass is electrically charged and it should be noted that variations in the electrical charge or the mass are not error sources. Charging methods include, but are not limited to, charging by the emission of charged particles from radioactive materials included within or externally to the sensing mass, charging by electrical induction, charging by corona discharge, charging by electron gun and charging by an electromagnetic or radiation source external to the sensing mass, including x-ray produced secondary electron emission.

Instrument accuracy is not dependent upon the maintenance of a constant charge-to-mass ratio. A high degree of vacuum should be maintained within the instrument to reduce Brownian motion accuracy limitations. Since the motion of the sensing mass is known along all three axes, the angular accelerations and velocities are, in principle, also known and can be determined when the readout information is fed to an appropriate computer. No stable platform need be provided when using the instrument as an inertial navigation or guidance device, as all linear and rotational motions of the sensor are used by the computer to continuously give accurate acceleration velocity and position data. The said data is totally free from the multitudinous error sources which are an inherent part of inertial platforms heretofore available. By separating two of the above-described instruments by a finite distance at an end of a solid, temperature compensated beam of fixed length, one meter for example, the resultant embodiment can be used as a compact gravity-gradiometer somewhat less sensitive to shock and tilt than that described in application Ser. No. 510,599. A gravity gradiometer of this type would be self-compensating for tilt and in fact can be used in any position rather than being necessarily restrained more or less closely to the local vertical.

Features of the present invention which are believed to be novel are set forth with particularity in the appended claims. The present invention, both as to its organization and advantages may be best understood by reference to the following description, taken in connection with the accompanying drawings in which:

Figures 1, 2, 3:
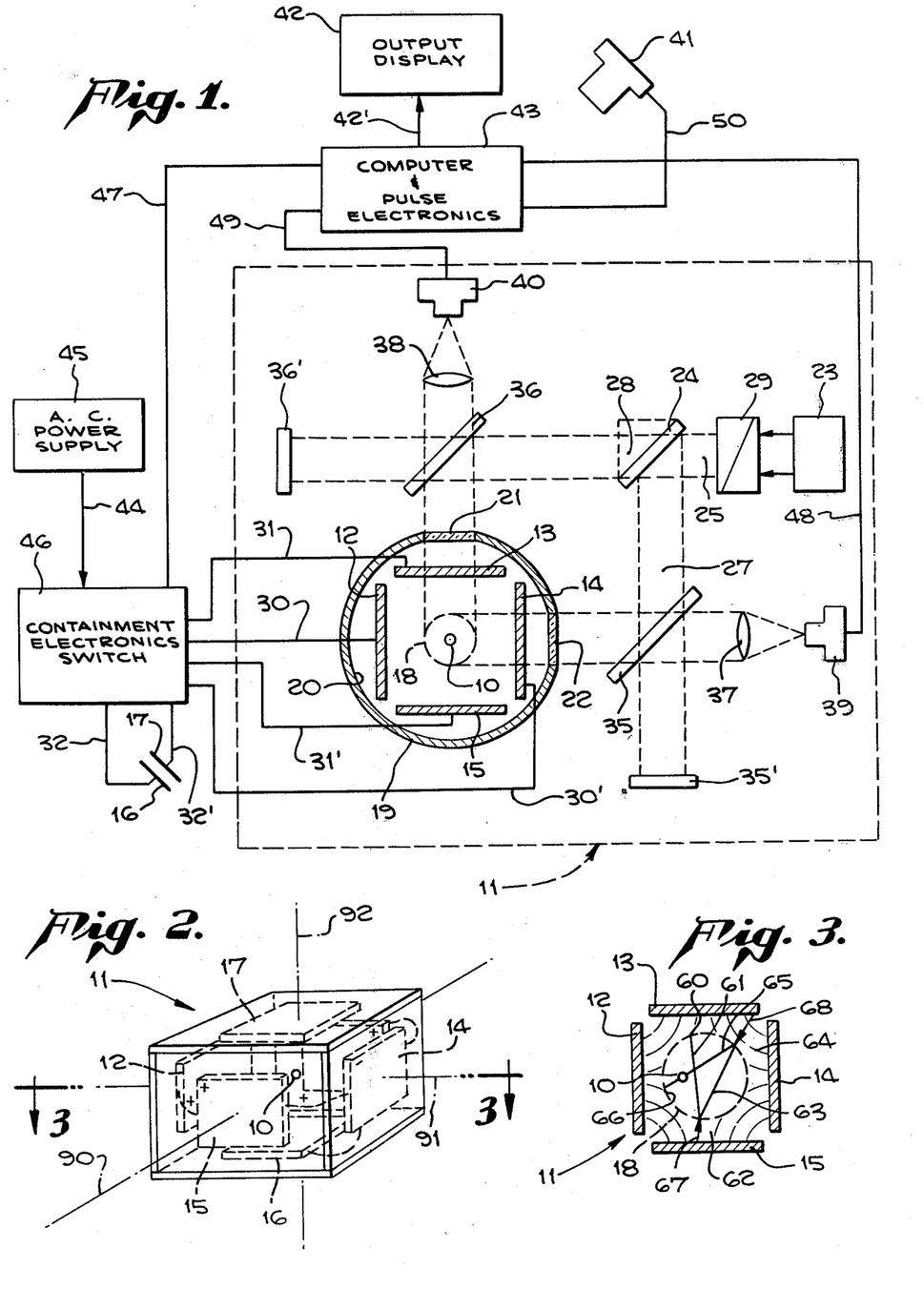
FIG. 1 is a schematic view of a dynamically restrained inertial reference including a simplified block diagram of the associated electronics and optical readout.
FIG. 2 is a fragmentary schematic perspective view of the containment electrode array of FIG. 1.
FIG. 3 is a cross sectional view on the line 3—3 of FIG. 2 showing the dynamically contained motion of a sensing mass within the inner containment area.

In an embodiment of the invention chosen for the purpose of illustration there is shown a sensing mass or retroreflector 10 in FIG. 1 which may be a hollow or solid spherical retroreflector of 60 to 100 microns in diameter. The sensing mass comprises the motivating element of an intermittently restrained inertial reference sensor (IRIR) indicated generally by the reference character 11. Surrounding the mass are six diametrically opposed containment electrodes 12, 13, 14, 15, 16 and 17 as shown in FIG. 2 in a box type configuration. The electrodes 12, 13, 14 and 15 may, in the alternative, be a single continuous ring electrode. Since all these electrodes in the chosen example are in effect connected together during the containment pulse, a ring electrode makes no significant different in the operation of the instrument.

Acceptable electrodes are optical quality flats having a conductive material vacuum deposited on the inner surface and allowing non-interference with the readout laser optics. A dotted circle indicates the boundaries of an inner, spherical containment space 18. Surrounding the space 18 is a vacuum envelope or housing 19 allowing a chamber 20 to be evacuated and maintained at the lowest possible gas pressure. Optical quality windows 21 and 22 in the vacuum envelope 19 allow laser beams originating from a laser 23 to illuminate the inner containment space 18 and allow a determination in displacement, direction and magnitude of the sensing mass or retroflector 10, by interferometric methods as suggested in the schematic representation. In the present embodiment, the readout is along all three axes.

The vacuum envelope 19 is arranged so as not to interfere with the three axes optical readout system. The readout system shown consists of three Michelson interferometer systems or the equivalent, functioning with a single laser 23 providing a beam of electromagnetic radiation as the source of illumination. One leg of this system perpendicular to the components of the diagram is omitted in the interest of clarity. A three-way mirror or beam splitter 24 distributes the laser beam 25 along the required three axes 26, 27, and 28. An isolator 29 is used in conjunction with the laser.

Two partially silvered mirrors 35 and 36 are shown, a third being in the view omitted for clarity. Condensing lenses 37 and 38 are associated with the respective mirrors. An optical detector 39 serves the lens 37 and an optical detector 40 serves the lens 38. These can be photodiodes of phototransistors matched in frequency and frequency response of the laser. A reflecting mirror 35' accommodates the mirror 35 and a reflecting mirror 36' accommodates the mirror 36.

Figure 5:
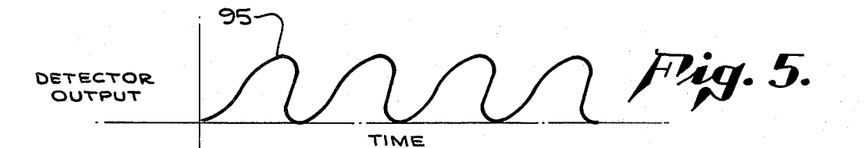
FIG. 5 is a chart of the detector pulse output of one type of readout system used for purposes of explanation.

A computer and pulse electronic circuitry are contained in components 43, 43', 43". Details of the component 43 are shown in FIG. 5. The component 43 receives information regarding displacement of sensing mass 10, from the three detectors 39, 40, and 41 by means of respective electric leads 48, 49, and 50.

For observation of performance of the component there is provided an output display 42 which for information can be in the form of latitude and longitude, or position, direction of motion, acceleration, velocity and in some cases altitude, etc. intercommected by a lead 42' to the component 43. This information is computed from information supplied by the interferometric optical output along all three axes of the device.

An A.C. or D.C. containment pulse power supply 45, usually one of 60 Hertz when using A.C. which is connected by a lead 44 to the containment electrodes through a containment electronic switch 46. Connections for those electrodes shown in FIG. 1 are leads 30 and 30' to electrodes 12 and 14, and leads 31 and 31' to electrodes 13 and 15. A connection 47 supplies a pulse to the switch 46 originating in the component 43 and pulse electronics so that the motion of sensing mass 10 does not exceed the boundaries of the predetermined spherical containment space 18.

Leads 32, 32' serve the electrodes 16 and 17 as shown in FIG. 1. Connections 47' and 47" serve respectively the detectors 40 and 41 as shown in FIG. 5.

During the reading phase of the instrument, i.e., that interval when the sensing mass 10 is in free and unrestricted motion within the containment area 18, the switch 46 connects all electrodes together in order to provide effective electrostatic shielding for the electrically charged sensing mass. When the computer and pulse electronics component 43 has determined that the sensing mass 10 has reached the outer limits of the containment space 18, a signal is sent to the switch 46 which applies an alternating voltage from the power supply 45 to the containment electrodes 12, 13, 14, 15, 16, and 17. The voltage is applied between all four electrodes including 12, 13, 14, and 15 in one plane, or the single ring electrode, as the case may be, and the plates or electrodes 16 and 17 in the plane 90° removed.

The object of the configuration just described is the dynamic containment of the sensing mass 10 within the containment space 18 so that acceleration, velocity and position changes may be computed by observing the motion of the single sensing mass when in a condition of free fall. In this configuration, such computation will be based upon pure inertial events with zero error sources due to frictional effects and excluding such common effects in inertial navigation and guidance systems as bearing friction produced precision in gyroscopes, accelerometer bias error, accelerometer scale factor error, accelerometer nonorthogonality, platform servo dynamic misalignment, gyro bias drift, gyro acceleration sensitive drift, vibration induced gyro compliance drift and other sources of error.

In one configuration, as illustrated and described in FIG. 1, the electrically charged sensing mass 10, using charging methods described, and being for example a retroflector of 100 to 150 microns diameter is first centered within the containment area 18 by the application of a relatively long A.C. voltage pulse applied to the six containment electrodes by switch 46. The switch 46 then disconnects the A.C. power and interconnects the containment electrodes. As a result the sensing mass 10 is then in a condition of free fall, being free from any outside forces excepting pure inertial forces. If the sensing mass or retrosphere is then displaced or accelerated relative to the containment electrodes or the instrument housing, or viewed alternatively, the housing is displaced or accelerated relative to the sensing mass along, for example, the vertical axis in FIG. 1, the detector 40 will detect that displacement as interferometric pulse or fringe counts. If the number of fringe or pulse counts fed to the computer and pulse electronics component 41, per unit of time, is constant, then the instrument is not being accelerated along the vertical axis but is moving at constant velocity.

If, however, the number of pulses varies per unit of time, then the instrument or the sensing mass is being accelerated along the vertical axis. As the sensing mass moves along the axis the electrical output as supplied to the pulse electronics of component 43 will appear as shown in FIG. 5. The appearance of each successive pulse means that the sensing means has moved one wavelength parallel to the axis. Whether it is moving toward or away from the vertical optics window 21 can be determined by the slope, positive or negative, of the pulse wave train. Other methods can also be utilized to determine the direction of motion of the sensing mass.

Figure 6:
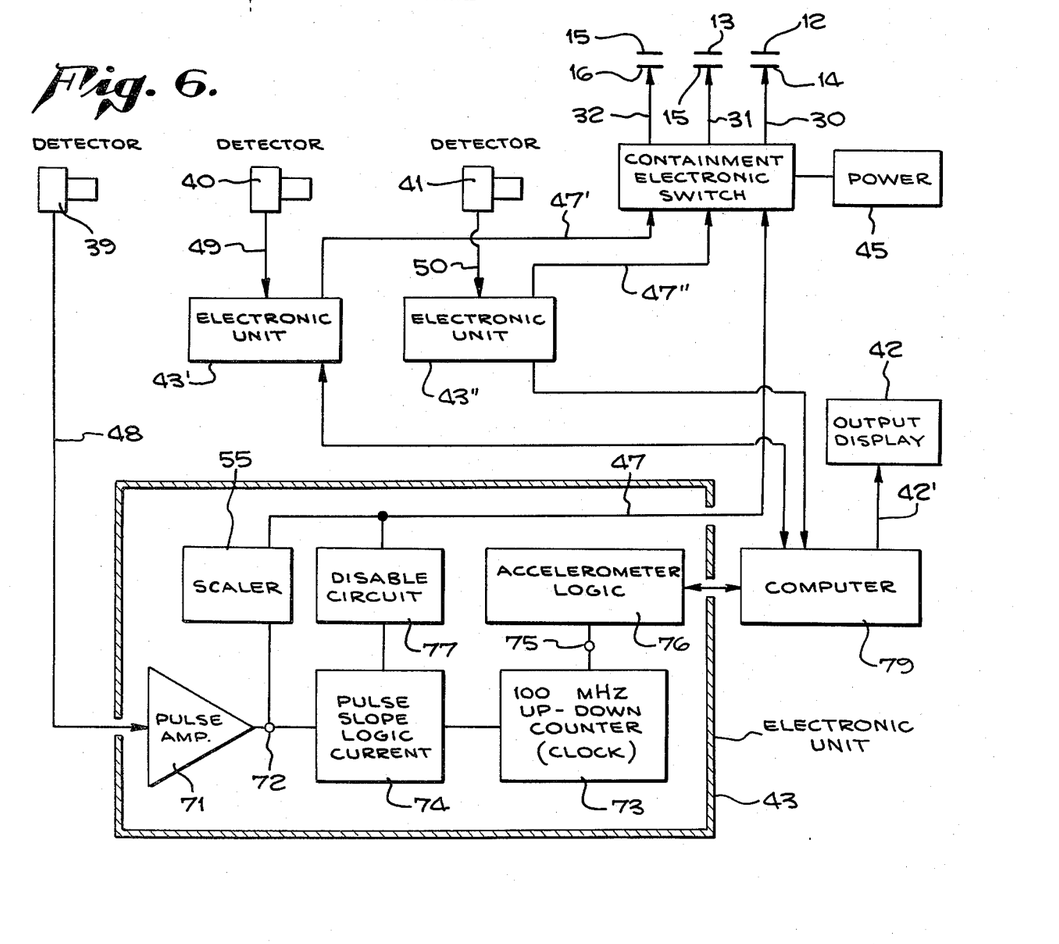
FIG. 6 is a schematic diagram of that circuitry of one configuration usable in the circuitry and pulse electronics unit of FIG. 1.

The pulses are counted by a conventional scaler 55 as shown in FIG. 6 when this is the circuit of the computer and pulse counter component 43 of FIG. 1. One computer 79 serves all three components 43, 43', and 43".

When the scaler reaches, 10,000, for example, for a full passage across the containment space 18 and the diameter of the space 18 is equal to approximately 1 centimeter, the scaler output pulse triggers the containment electronics switch 46 (see FIG. 1) and applies, for example, an A.C. electrical pulse to the containment electrodes, this A.C. pulse being supplied by the containment pulse power supply 45. It has been determined that the most practical frequency of A.C. for most applications is 60 Hertz. This is based upon the mass of solid retroflector that can be supported with a 10 g loading confined within a one centimeter containment space when using reasonable voltages. That applied A.C. voltage pulse is adjusted to turn the sensing mass around and send it moving along the axis in a contrary direction roughly toward the center of the containment space 18. The application of the A.C. containment pulse to the containment electrodes effectively exerts a force on the sensing mass, whenever it is displaced from the center of the containment space 18, which tends to redirect its motion so as to keep it within the containment space 18.

It is also advantageous to employ a confinement method that uses D.C., rather than A.C. exciting pulses on the electrodes. While D.C. potentials applied to the electrodes cannot produce stable confinement of a charged test mass while applied steadily, (as can A.C. potentials), the use of active sensing of the test mass position and triggering of electrode potentials, when required yields stable confinement for pulses of either A.C. or D.C. Furthermore, the voltage levels required for the D.C. case are much smaller than for A.C. Also the instrument is capable of sustaining much higher G forces.

The illustrative vector diagram of FIG. 3 shows the sensing mass 10 starting from a point 60 traveling first along a path 61 with a certain force to a point 62 at the outer boundary of the containment space 18. Here it is reversed to travel a path 63 to another point 64 on the boundary. Again it is reversed to travel a third path 65 to a point 66 on the boundary, reversals and new paths continuing as long as the system is in operation.

Action of the sensing mass 10 is indicated in FIG. 3 where the sensing mass 10 is on the third pass across the containment space. Force vectors 67 and 68 indicate the direction, but not necessarily the magnitude, of the force exerted upon the sensing mass 10 when approaching the predetermined boundaries of the containment space 18. This force is applied when the short A.C. containment pulse is delivered to the containment electrodes. The velocity that the sensing mass is given during the relatively short containment phase, and may be regulated if desired by the direction and magnitude of the G forces that the instrument is, at that time, experiencing, in order to effectively increase the G tolerance of the instrument. When considering the principle of operation it is not important to know the speed or velocity that the sensing mass is given by the A.C. containment or confinement pulse.

There are three optical systems referred to in FIG. 1, one for each axis. Consequently, the sensing mass 10, at all times being electrically charged, is dynamically confined to the space 18 which is usually spherical and of predetermined diameter. In the example discussed the diameter is 10,000 light wavelengths or about 1 centimeter.

By suitable choice of parameters, the A.C. containment voltage pulse can be adjusted to be of very short duration, that is to be of very short duration compared to the length of time required by the sensing mass to move the 10,000 wavelengths. Thus, the sensing mass is free coasting most of the time, namely greater than 99 percent of the time. It is always possible to determine which direction the sensing mass is moving along a given axis by electronically "looking at" the slope of the pulse train as indicated in FIG. 5, which however is only one of several acceptable methods.

An alternate method of determining direction of the test mass travel along a given axis is to employ a confinement method wherein confining electrodes carry a D.C. voltage. Whenever the active sensing system determines that the mass is about to leave the containment space 18, the electrode nearest the mass is activated with a pulse of the same sign as the charge on the mass, thus repelling it, and in particular, giving it an increment of momentum along that axis to which the activated electrode is normal. It follows, then, that the component of velocity of the mass along any axis has a sign determined uniquely by which of the two electrodes intercepting that axis has most recently fired. The necessary record of firings of each pair is finally kept by a single flip-flop binary register.

The whole system, that is the evacuated chamber 20 enclosed by the housing 19, is a few cubic centimeters in size and is evacuated, baked and gettered with standard vacuum tube practices. All internal parts are metal or glass. The acceleration and all useful time derivatives of the acceleration of the sensing mass or retroflector relative to the apparatus can be measured electronically using digital I.C. electronics as indicated in the circuit of FIG. 6. Standard I.C. chips may be used throughout. Three identical circuits of this general type, FIG. 6, are required, one for each axis. One computer and display is sufficient.

The type of gradiometer herein is especially practical for certain applications where inclination is a problem, such as oil well or borehole logging, beyond the limited inclination allowable using a gravity-anomalometer as described in parent application Ser. No. 510,599. Many petroleum and natural gas wells are inclined as much as 15% and it is important to have a gravity gradient recording device capable of in-motion operation that has no limitations as to inclination. In the embodiment of the invention herein disclosed in FIG. 4 a containment pulse A.C. or D.C. power supply and containment electronic switch 85 is essentially the same as the switch 46 and containment pulse power supply 45 of FIG. 1 and a computer and pulse electronics component 86 and output display 87 perform the same function as the component 43 and display 42 of FIG. 1 except that the displayed parameters are gravity-gradient and inclination.

The first pulse carried by a lead 48 to a pulse amplifier 71 and to appear at a point 72, FIG. 6, after the A.C. containment phase is over, as previously described, starts an up-down counter 73. This counter is an accurate clock and starts producing pulses at 100 MHz, when gated "up". The next pulse to appear at point 72 goes through a logic circuit 74 and gates the up-down counter 73 "down".

If the sensing mass 10 has been moving at a constant velocity along the axis the number of "up" counts is exactly equal to the number of "down" counts and the up-down counter puts out no pulses at a point 75 to an accompanying accelerometer logic 76. In other words, there is no acceleration along that axis. When the sensing mass approaches the perimeter of the space 18 a disabling circuit 77 becomes operative and temporarily interrupts the pulse amplifier. Note that any motion of the sensing mass 10 perpendicular to the given axis does not affect the results, by Newton's first law. It may also be noted that this result is independent of the electrical charge on the sensing mass, of the mass of the sensing mass or of the magnitude of the velocity of the sensing mass.

Stated simply, if the sensing mass is coasting with constant velocity parallel to the laser axis, it takes exactly the same time to move equal increments of distance, in this case one wavelength of light or about $10^{-4}$ centimeters. However, if the sensing mass is accelerating along the laser axis then the length of time required to move each successive wavelength of distance will not be the same and the output of the up-down counter 73, FIG. 6, at the point 75 will not be zero.

Although TTL-IC electronics can be used throughout, the computer memory access time is about one microsecond and since it will take about 1,000 computer operations to make each successive computation or integration, about 1,000 fringes will be counted in the above example in each successive computation, that is the logic circuit 74 will let the clock run "up" for 512 fringes and then turn it "down" for the next 512 fringes.

For example, if the sensing mass is coasting at about 100 centimeters per second, it takes about one microsecond to move one fringe so that the "up" counter will store 51,200 counts during this interval and the "down" counter will erase all of them. If, however, the down counter erases only 51,000 counts, then it requires less time for the sensing mass to move the second 512 microns or wavelengths than it did to move the first 512 microns, therefore the sensing mass is accelerating.

In this example its acceleration is $$a = \frac{\Delta V}{\Delta t} = \frac{\frac{\Delta d_2}{\Delta t_2} - \frac{\Delta d_1}{\Delta t_1}}{\frac{\Delta t_1 + \Delta t_2}{2}}$$

where
a = acceleration
v = velocity
t = time
d = distance

But $\Delta d_2 = \Delta d_1 \equiv \Delta d = 512.0$ microns with, in this configuration, an accuracy determined by the electronics ability to trigger at the same point in the successive peaks as illustrated in FIG. 5. Thus in the above example, $$a = \Delta d \frac{2(\Delta t_1 - \Delta t_2)}{(\Delta t_1)(\Delta t_2)(\Delta t_1 + \Delta t_2)}$$

$$\simeq 7.6743 \times 10^2 \, CM/sec^2 \text{ or about 1 g.}$$

The accuracy of the IRIR, in this embodiment, is determined by the digital character of the clock.

The computer now starts to integrate using the above value of acceleration. The next two sets of 512 fringes gives it a new value of acceleration to use and a value of da/dt to store. Since the motion along all three axis is known, the angular acceleration and velocities are, in principal, also known. As a consequence to stable platform needs to be provided since all rotational and linear motions are used by the computer to continually keep track of the total motion of the sensing mass.

The above-described use of the readout information as supplied by the detectors to the pulse electronics in the computer is only one example of how this information can be utilized to achieve the same results, namely, that of acquiring the vector sum of all accelerations that the instrument is experiencing, while in a strap-down mode, in addition to rotational translation of the instrument relative to inertial space, i.e., roll, pitch and yaw.

For example, as shown in FIG. 2, the cubic array of three pairs of electrodes are disposed on the separate axes 90, 91 and 92. A shift in any one axis is immediately reflected in the readout. Moreover the electronics in such simultaneous shift of all three axes in any amount or direction is otherwise reflected in the readout. Measurements are independent of either the amount of or the stability of the electrical charge on the sensing mass. The measurement is independent of the absolute mass of the sensing mass. The methods utilized normally are not limited to digital techniques. No. D.C. voltages are required. The whole apparatus including electronics, computer and the readout display can be extremely small and compact, being rugged and insensitive to temperature changes.

The time measurements are dependent, in this embodiment, upon gated scalers with an inherent accuracy of one part in $10^9$ or much better. The distance measurement is affected using the wavelength of light directly with an inherent accuracy which is commensurate with the frequency. The device is based upon the use of the laser to simultaneously measure position, velocity, acceleration, rate of change of acceleration, and also to furnish an accurate length standard upon which to base them measurements.

Use of lasers in making precise interferometric measurements is well established including the utilization of such methods to precisely determine the position, velocity, acceleration, etc. of free-moving retroflectors or "cats eyes." For the best accuracy the turn around time or "dead" time of the sensing mass wants to be small compared to the "drift" time, that is, the time that the sensing mass is moving, without restraint within the containment space. During the "dead" time, produced by the application of an A.C. containment pulse, the counting electronics are immobilized but not the integration electronics.

Figure 4:
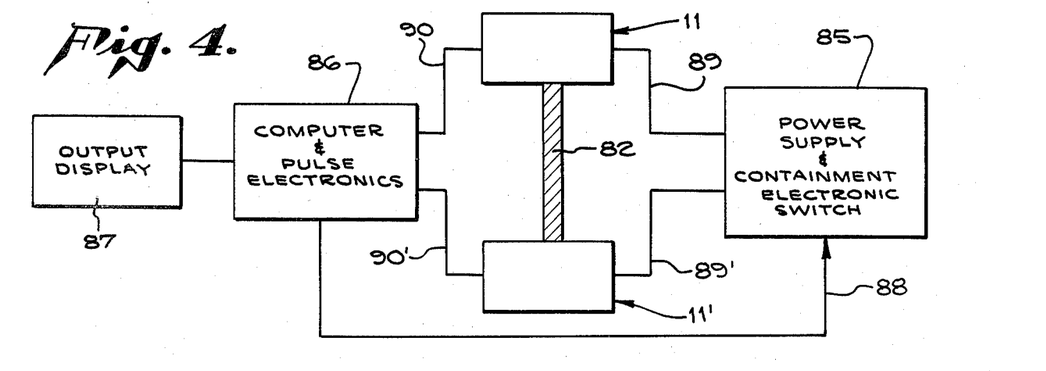
FIG. 4 is a schematic view of two dynamically intermittently restrained inertial reference (IRIR) sensors in a gravity gradiometer and/or advanced inertial navigation or guidance configuration including a simplified block diagram of the associated circuitry used in conjunction with the instrument.

The last stored values of the inertial parameters are used in the on-going integration so that by making the "dead" time short, less than 99 percent of the drift time, this single error source is minimized and can be even further reduced where very high accuracy inertial navigation and guidance is required. This is a consequence of utilizing more than one IRIR as illustrated in FIG. 4 so that there is practically continuous sensing of variations in the inertial parameters without even the small "dead" time error source of the single IRIR instrument. For all known applications of the present, and those likely to be determined for the next decade, the accuracy of the single IRIR sensor far exceeds the requirements.

It may be noted that should accuracy greater than this be required the IRIR sensor 11 may be combined with a gravity gradiometer such as shown in FIG. 4 of the present application, so as to supply actual values of variations in acceleration due to gravity while moving or in flight. Because no accelerometer system is capable of differentiating between the acceleration due to gravity and the acceleration of a vehicle in motion in the earth's gravity field, it is usually necessary to compute or approximate the acceleration due to gravity as a function of the known position of the moving vehicle. As the position of the moving vehicle usually is determined by a more or less accurate inertial system, it can readily be seen that the lack of actual in-motion gravity information can be a serious error source, especially in conventional inertial systems.

The position must be known very accurately as well as the actual value of the acceleration due to gravity over the entire path of the vehicle. A gravity gradiometer such as is illustrated in FIG. 4 can eliminate this error source when combined with an inertial system, or any system. It can supply the actual value of gravity to the navigation computer continuously and naturally while in motion.

FIG. 3 has already been used above for purposes of explaining the function of the IRIR. It simply shows the possible motion of the sensing mass 10 while making three passes within the containment area. It may be noted in the drawing that the sensing mass is again approaching the boundaries of the containment space 18 and of course this will trigger the containment electronics applying a force such as shown for the previous "bounces" and indicated in direction but not magnitude by force vectors 67 and 68 in the figure.

FIG. 4 represents a circuit including two IRIR sensors 11 and 11' complete with containment electronics, vacuum envelopes, lasers and three axis interferometric optical systems, separated a known distance by a rigid beam 82 preferably temperature compensated. Some details of the circuit of FIG. 4 may be varied to provide different performance configurations of the IRIR system.

A first configuration may be that of utilizing the two IRIR sensors 11 and 11' to sense changes in the acceleration due to gravity and positioned a known distance apart by the rigid member 82. The structure and operation of the two IRIR devices 11 and 11' is in no way different from that of the description of FIG. 1 except for the application and external configuration. In this case the highly accurate accelerometer function of the IRIR sensor is utilized to determine changes in the gravity gradient by direct measurement.

Meanwhile the rotational translation sensitivity of the two IRIR sensors is put to use in maintaining the attitude of the instrument to a local gravity field. Any desired attitude can be maintained, vertical or horizontal.

An electrical connection 88 supplies coded commands to the A.C. switch 85 allowing A.C. containment pulses to be delivered by leads 89, 89' to the IRIR units 11 and 11' and pulse signals to be received through leads 90, 90' as needed.

In a second configuration to be considered, FIG. 4 may be assumed to comprise a complete highly accurate inertial navigation system, including the two IRIR inertial sensors 11 and 11' separated along the local vertical by the rigid member 82 which, under such circumstances is usually ½ to 1 meter in length. In this configuration, accurate in-motion gravity measurements are continuously being made in addition to the inertial parameters of the vehicle, except that the true acceleration of the vehicle relative to inertial space can be differentiated from the acceleration due to gravity. By the last identified arrangement the error source is eliminated which would be produced when the path of the vehicle experiences varying and unknown gravity anomalies.

The combined or averaged output of the two IRIR sensors 11 and 11' effectively reduces the previously discussed "dead" time of a single IRIR sensor to an infinitesimal amount, since the dead time of the two separate IRIR sensors rarely occurs simultaneously. Thereby, the use of two IRIR sensors as shown in the last described configuration serves a dual function and eliminates the two remaining error sources of a single IRIR navigation or guidance system, that is, variation in known gravity and "dead" time error. Functions of the A.C. power supply and containment electronics switch 85, the computer and pulse electronic unit 86 and the output display 87 are essentially the same as described for FIG. 1.

Although only two devices are shown in FIG. 4 in the interest of clarity, it should be understood that for special adaptations three or more such sensing devices at fixed positions with respect to each other and acting in concert may be employed.

FIG. 5 illustrates the pulse output curve 95 of a single detector, for purposes of explanation. Photodiodes, phototransistors or other types of detectors may be used which are usually matched, spectrally, to the frequency of the laser.

FIG. 6, as previously discussed, is a detailed schematic diagram of components for a single detector 39 feeding the component 43 through the lead 48, namely, the computer and pulse electronic unit 43 in FIG. 1. It must be remembered that three of these circuits are required, one for each readout axis but that only one computer and display are required. Details are omitted for the detector 40 and its lead 49, also the detector 41 and its lead 50.

In a device having a high degree of accuracy of the inertial reference disclosed herein, it becomes desirable to periodically check for malfunction. A conventional malfunction check can, of course, be proposed by simultaneous operation of three identical sensing devices. Should one of such three devices be at variance with the other two a malfunction would be indicated. Such system obviously would require three times the instrumentation and occupy three times as much room, without adding the functional capability of the device itself. It is also true that malfunctioning could be detected by a comparison with such an instrument as an inertial platform with its customary gyroscopes and other mechanical expedients. A comparison test of this character, however, would be inadvisable with the reliability of such a system being materially less than the device of the invention. The malfunction detector would be subject to all of the shortcomings of such auxiliary systems.

Figure 7:
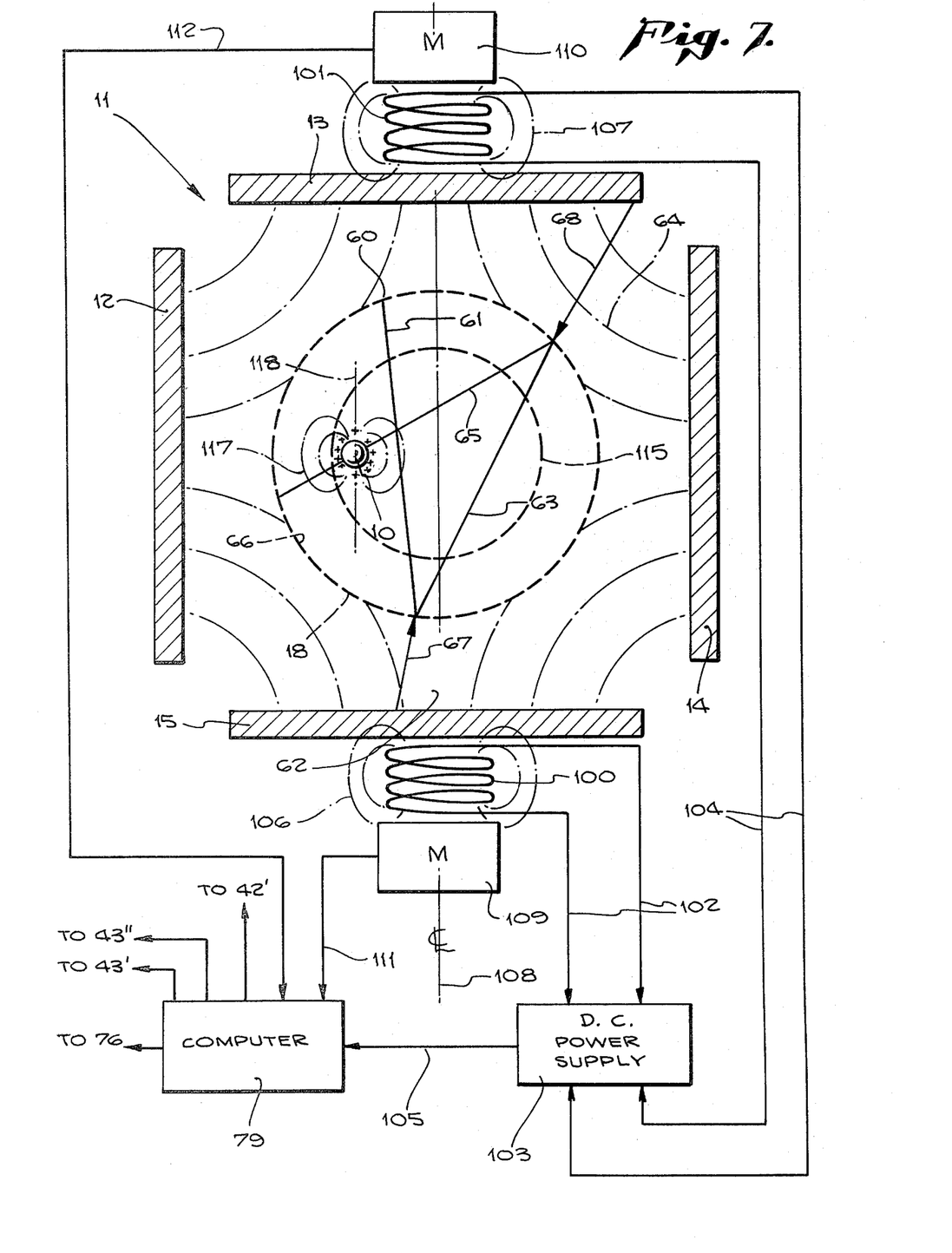
FIG. 7 is a schematic view of the central portion of FIG. 1 drawn to larger scale and in which is incorporated a detector for sensing malfunctioning.

As a consequence, there is provided a built-in detector shown in FIG. 7 making use of much of the same instrumentation as the sensing device itself and functioning with virtually the same degree of reliability, accuracy and compactness, and capable of making a malfunction attitude check at any cyclical period without interruption in operation of the sensing device itself.

As shown in FIG. 7, there is provided a pair of alignment coils 100 and 101. Leads 102 from the coil 100 connect to a power supply 103 which in the embodiment shown is a D.C. power supply. Similar leads 104 connect the alignment coil 101 with the same power supply 103. To control the cyclical operation of the power supply there is a lead 105 interconnecting the power supply 103 with the computer 79. When the power supply 103 is energized by computer operation, it sets up a magnetic field 106 and 107 at the respective coils 100 and 101 which determine an alignment axis 108 extending centrally with respect to the electrodes 13 and 15 and through the spherical space 18. Although a single alignment axis 108 should be sufficient, additional alignment axes could also be provided in a similar fashion intermediate the other two pairs of electrodes.

Contemporaneously with the alignment coils there is also provided a pair of magnetometer sensors 109 and 110. The magnetometer sensors are spaced preferably outwardly relative to the respective alignment coils 100 and 101 and likewise on the alignment axis 108. A lead 111 connects the magnetometer sensors 109 to the computer 79 and a lead 112 connects the magnetometer sensors 110 to the same computer 79.

In the detector device, it becomes desirable to have the computer 79 so programmed as to define a spherical sensing space 115 of diameter smaller than the diameter of the spherical dynamic containment space 18, previously described. The diameter of the space 115 may be 10% smaller than the diameter of the space 115 or at even a greater variance.

In making use of check instrumentation shown diagramatically in FIG. 7, it is of consequence to note that the sensing mass 10 should be a charged particle of the type made reference to in U.S. Pat. No. 3,148,456, to which reference is made in this connection. A reading of the Patent will assist in an understanding of application of the principal there disclosed to the attitude check instrumentation forming part of the present invention.

Under the circumstances made reference to, provision is made to utilize the energy of radioactive decay to produce angular rotation of the sensing mass 10 here taking the form of a charged particle. The object of this configuration is to utilize the gyroscopic properties of a rotating body for the double purpose of sensing displacements and generating magnetic force lines 117 which result from rotation.

The rotational energy made reference to is supplied to the sensing mass by virtue of directional leakage or exchange of electrical charge relative to the spherical sensing mass. In the configuration made reference to the spherical sensing mass is so shaped that the required electrostatic leakge or exchange of charge may be directional and capable, by virtue of Newton's Third Law of Motion, of imparting an angular velocity to the sensing mass. It is recognized that the electrical potential upon a body is a function of its radius at any point off the surface. The greater the radius of curvature, the greater the concentration of charge. The mass, by virtue of its emission of charged particles and because of the insulating properties of the vacuum or gas within the vacuum envelope 19, builds up quickly to a higher electrical potential. The resulting electrical charge, usually positive for the sensing mass, must be dissipated at a constant rate through the partial vacuum or gas within the envelope 19 in order to keep a fairly constant potential on the surface of the mass 10 relative to the surfaces of the envelope, the envelope being also assumed to be spherical. This directional leakage is similar to that observed in the electrostatic pinwheel. The rotational energy for the pinwheel originates in the reaction forces developed due to the emission of charge or the absorption of charge from the surrounding gaseous environment. In the relationship herein disclosed the situation is similar except that the surplus of electrical charge is due to the generation of high potentials by virtue of the emission of charged particles from a radio-active element contained within an insulated body. The radio-active condition may be carried by the mass or generated from the exterior. The mass 10, acting as a gyro rotor may contain, in effect, veins, sharpened points, or edges, so that the electrical charge leakage is directional with respect to the mass. Force vectors are developed due to the reaction forces acting about an axis 118 on or parallel to the axis 108 and in such a direction relative to the mass as to produce the required angular rotation relative to the envelope 19, shown in FIG. 1. Rotating as described, the mass produces the external magnetic field 117. As a consequence, angular displacement of the envelope 19, and incidently the vehicle frame, whether it chances to be airborne, missle carried, or otherwise, relative to the axis of the rotating mass and inertial space can be measured in magnitude and direction by noting the angle the magnetic lines of force 117 make with a fixed frame of reference relative to the surface of the envelope.

The properties just described consequently in the present invention are utilized to check against operation of the sensing device of the invention. When, by action of the computer 79 and related instrumentation, the power supply 103 is momentarily energized as the sensing mass 10 approaches circumference of the spherical sensing space 115, the alignment axis 108 is erected by the magnetic fields 106 and 107. Simultaneously the external magnetic field 117 about the sensing mass 10 by action of the magnetic fields 106 and 107 causes the axis of rotation of the sensing mass 10 to be correspondingly aligned, while the mass 10 occupies the space between the spherical spaces 115 and 66, ceasing prior to reaching the circumference of the space 66. When this alignment is not consistent with the functioning of the sensing device of the invention directed to the same purpose, this circumstance is reflected in the computerized electrical means, and can be displayed as a conventional red light or other conventional error signal.

Such an attitude check can be established at any desired cycle, such check being virtually continuous, or at 5 to 30 minute intervals. Moreover the built in check instrumentation described herein in detail acting on the same principle may also be made applicable to devices other than those for inertial guidance as, for example, devices of comparable character programmed to measure gravitational anomalies.

Reference is again made by way of explanation of the employment of concentric spherical spaces in the instrumentation herein disclosed. The spherical space 18 defines the limit of movement for the sensing mass established by action of the laser 23. It is important, therefore, that the attitude check instrumentation be activated when the laser is not active. For that reason, the spherical sensing space 115 is established inside the spherical space 18, at a functionally safe distance.

Figure 8:
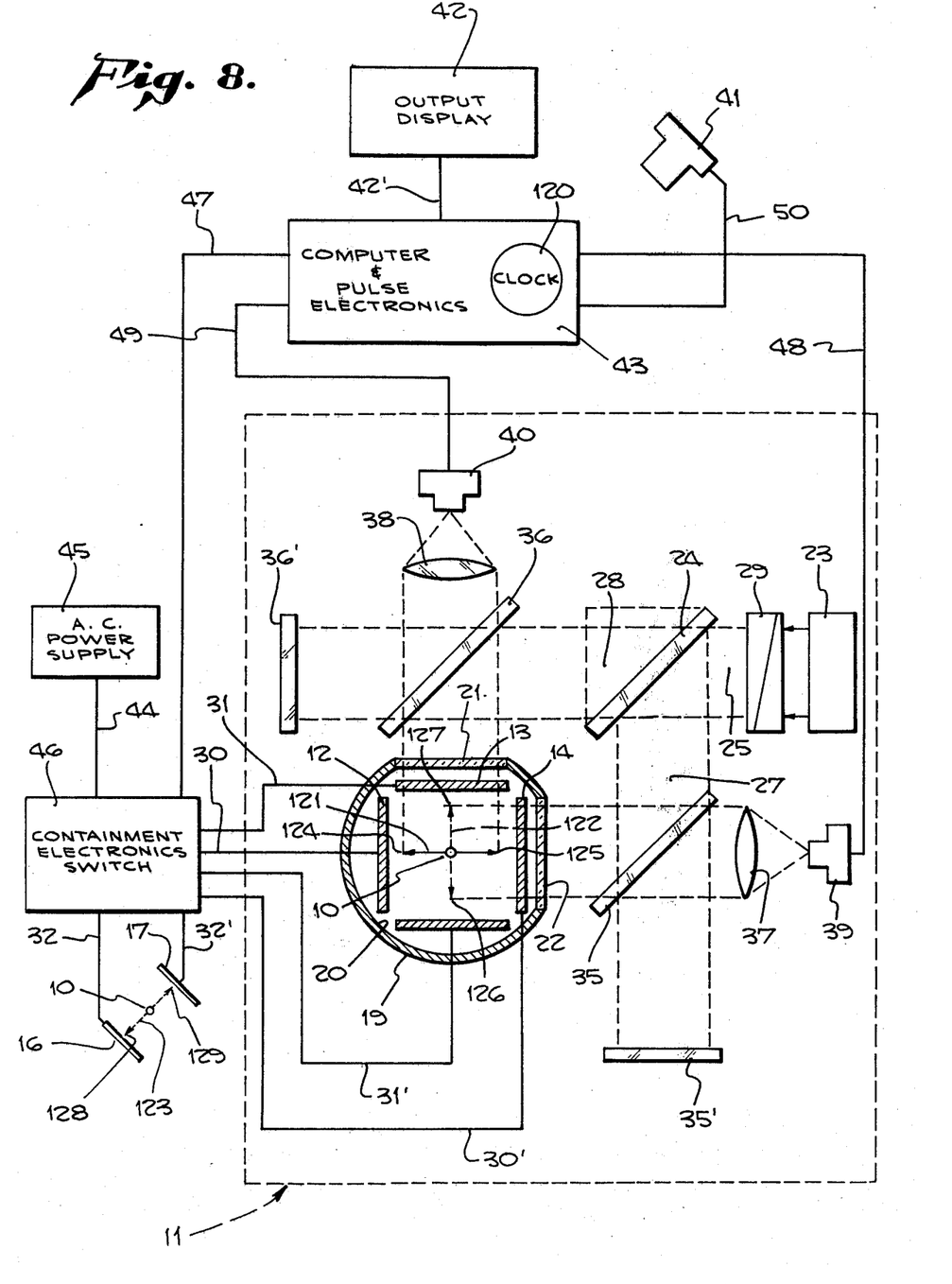
FIG. 8 is a fragmentary schematic diagram similar to FIG. 1 showing a second form of the invention.

In the form of the device as shown in FIG. 8 there is a modification in the pattern of movement of the sensing mass 10 in that instead of a random reversing pattern within the spherical space 18, the sensing mass 10 is under constant control. For this form of the invention, the computer and pulse electronics 43 has incorporated in it a special clock feature 120.

As shown in FIG. 8, the sensing mass 10 has three controlled paths of movement, namely a first path 121 of oscillating or reciprocating movement between opposite electrodes 12 and 13, a second path 122 of movement between the electrodes 14 and 15, and a third path 123 of movement between the electrodes 16 and 17. The clock feature is so timed as to shift successively from the paths 121, 122 and 123 at equally spaced intervals of a fraction of a second, and, between intervals to so act as to locate the sensing mass 10 at the center intermediate the six electrodes. Accordingly the sensing mass has three phases of oscillation, each being in a straight line 90 degrees removed from the other two. In the interest of accuracy the first path 121 between opposite points 124 and 125 is the same length as the path 122 between opposite points 126 and 127. These paths are also the same length as the paths 123 between opposite points 128 and 129. If a spherical space were involved, the points would all be upon its surface.

In the same manner as has been previously described, the sensors 39, 40 and 41 serve to limit travel of the mass 10 in whatever the direction may be, signalling appropriate reversal of travel in that particular line of travel.

When the device is to be operated following the disclosure of FIG. 8, the sensing mass 10 is centered to start the operation, i.e. midway between each pair of oppositely positioned plates. To initiate oscillating operation in one of the three paths of movement, a voltage is applied to the plates for a short period of time, and then discontinued. The containment electronics 46 sustains the oscillation within the boundaries identified by opposite ends of the three paths of reciprocating movement of the sensing mass 10.

Under circumstances where the device is mounted on a vehicle, variations in the acceleration or speed of travel of the vehicle are reflected in the acceleration of travel of the particle which, fed into the chamber and pulse electronics 43, reveal the relative position of the instrument and vehicle on which it serves, and of the speed, as compared with a selected reference.

In this form of the device also, accuracy can be checked by the same means as disclosed with reference to FIG. 7.

When the form of device as in FIG. 8 is to be used to detect gravitational anomalies, two (or more) devices are made use of located, for example, one above the other. An illustrative example would be for one to be mounted in the IRIR sensor 11 and the other in the IRIR sensor 11', separated a fixed distance by the rigid beam 82. The apparatus functioning as described measures the gravity gradient between the positions of the two devices. Such a measurement can be made at any time, as for example, while an airplane is in flight over an area to be surveyed.

Figure 9:
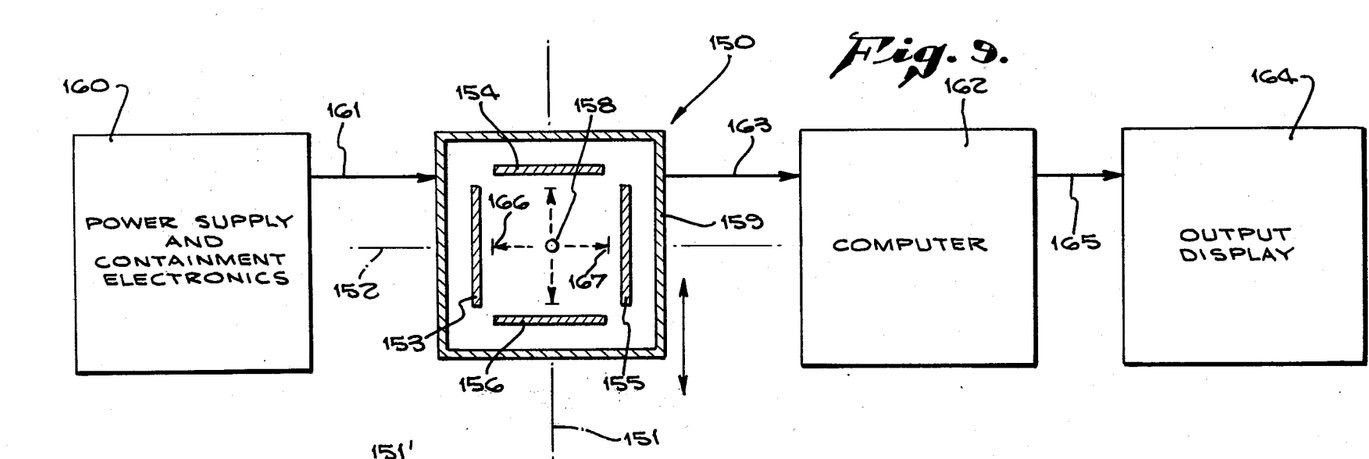
FIG. 9 is a schematic diagram of another form of the invention showing utilization of a single containment unit along one axis.
Figure 10:
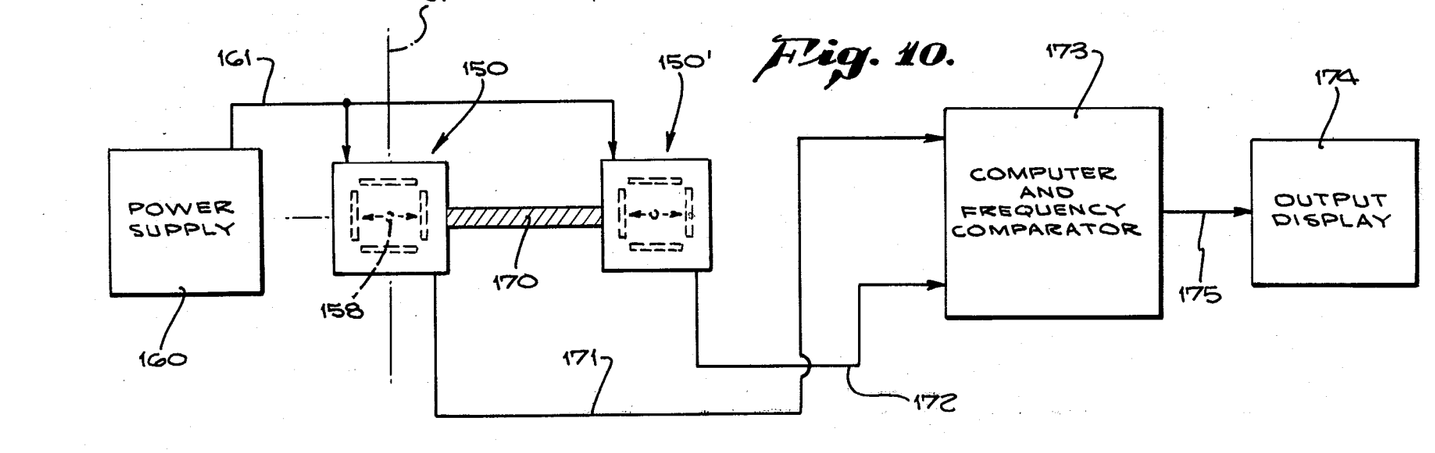
FIG. 10 is a schematic diagram of the form of invention of FIG. 9 showing simultaneous utilization of two coupled containment units of the type shown in FIG. 9.
Figure 11:
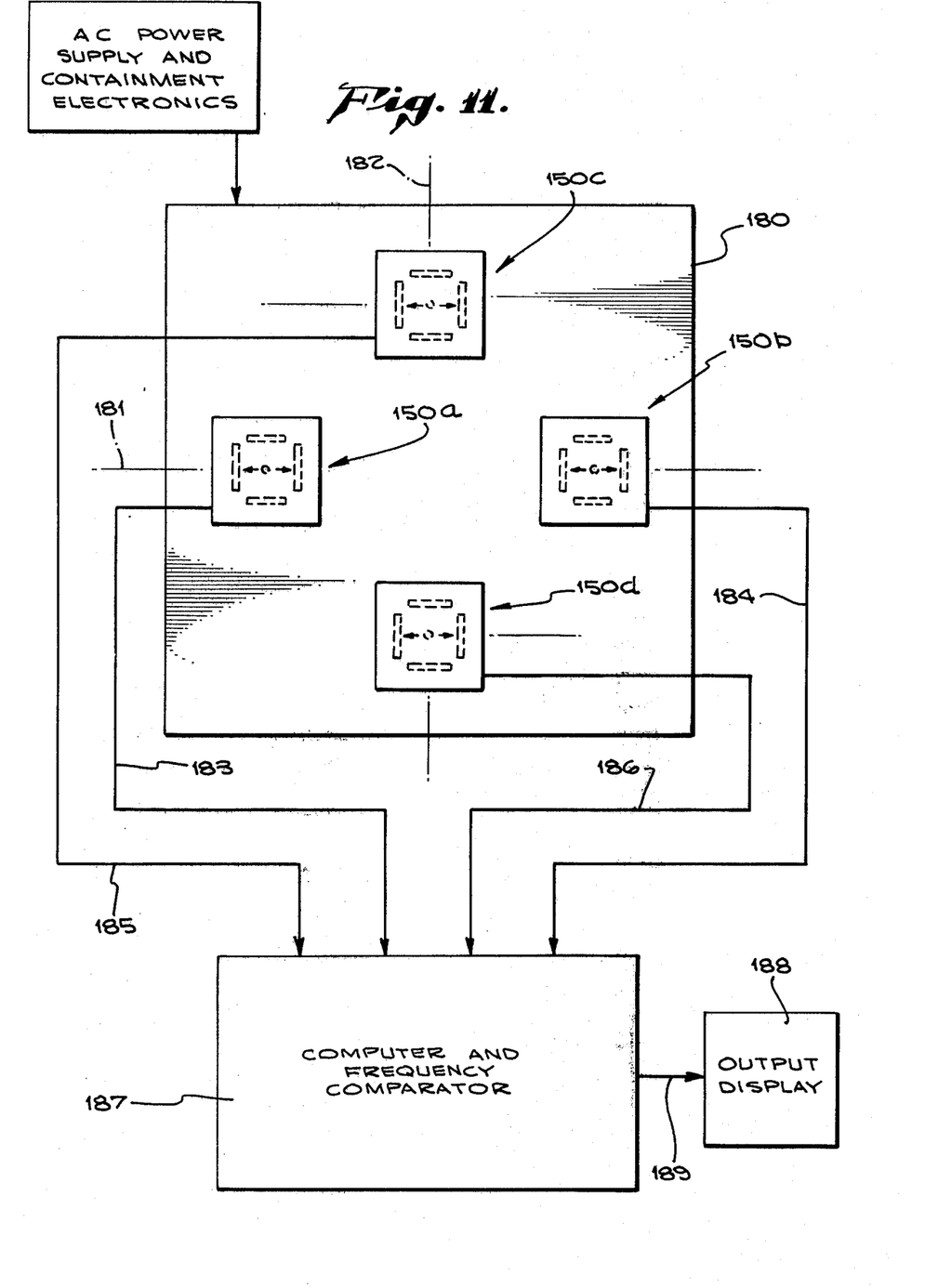
FIG. 11 is a schematic diagram of the form of invention of FIG. 9 but showing simultaneous utilization of four of the containment units mounted in pairs in a housing on two intersecting axes.

In the form of invention of FIGS. 9, 10 and 11 containment units 150 are made use of which are the same in all substantial respects as the intermittently restrained inertial reference sensors 11 shown in FIG. 2. In FIG. 9 a single unit assembly is featured and is one directed primarily to motion along a single axis of sensitivity 151 which, in the selected embodiment, is a vertical axis.

In the containment unit 150 is the customary cubic array of six diametrically opposed containment electrodes, only four, namely, 153, 154, 155 and 156 of which are shown, these four being located on respective axes 151 and 152 in the same vertical plane. Two more, not shown, are located at opposite ends of an axis perpendicular to the axis 151 and the transverse axis 152. The containment electrodes act to dynamically contain a sensing mass 158 of the same type previously identified and described. A housing 159 surrounds the cubic array.

A power supply and containment electronics unit 160 connected by a cable 161 to the containment unit 150 provides power for the electrodes and the electronics sufficient to activate the containment electrodes. To handle operative output from the containment unit 150 a computer 162, connected to the unit by a cable 163 receives and interprets the operating information for presentation on an electronic output display 164 to which it is connected by a cable 165.

In the basic phase of this form of invention in FIG. 9 operation is commenced by initially setting the sensing mass 158 in stable equilibrium by applying an appropriate A.C. voltage to the six plates of the cubic array. There is then applied a sinusoidal or pulsating D.C. voltage, over the A.C. initial voltage, and in one direction, to produce a constant periodic motion along a linear path of the sensing mass 158. In the selected example one path is along the axis 152 and extending between points 166 and 167.

As long as the containment unit is at rest, no measurable change occurs in the periodic motion. Should the containment unit now be moved upwardly along the vertical axis 151, there will be an external gravitational or inertial effect, or both, upon the sensing mass 158. This will be felt as an increase in the frequency of oscillation of periodic motion for movement vertically upward or a decrease in the frequency of oscillation of periodic motion for movement vertically downward.

When the changes in frequency are appropriately sensed and imposed upon the computer 162, the containment unit 150 may function, in effect, as an accelerometer. Should the motion, in the alternative, be transverse along the axis 152, or the axis perpendicular to the axes 151 and 152, the containment unit 150 also functions in effect as an accelerometer.

Whereas the axis of periodic motion has been initially referred to as being in the right and left horizontal direction of FIG. 9, the sinusoidal or pulsating D.C. voltage could be applied in a manner causing periodic motion of the same amplitude along the axis 151. With periodic motion as last made reference to movement of the containment unit, vertically for example would result in a corresponding change in the frequency of periodic motion, capable of being sensed and reported as previously described.

In a second phase of this form of the invention shown, in FIG. 10, two separate containment units 150, 150' are mounted at opposite extremities of a bar 170 of fixed predetermined length. The units are electrically operated in the same fashion as in FIG. 9, electrically interconnected by cables 171 and 172 to a computer and frequency comparator 173 and mounted upon a vehicle or missile. The twin mounting is effective in sensing pitch.

Assuming, for example, periodic motion of the sensing mass 158 in both containment units 150 and 150', should there be relative shift of the unit 150 on an axis 151' with respect to the unit 150', the frequency of periodic motion of one will be changed with respect to that of the other. This will be true whether or not one or both units move with respect to the other. When the effect of this change is fed to the computer and frequency comparator, the direction and extent of pitch of the vehicle or missile can be determined.

Inasmuch as there will have been established two different periodic motions in the interconnected containment units, there will be a resulting "beat" such as occurs, for example, when two vibrating strings of the same length are set in motion. As a consequence, beat frequencies can also be made use of when applied to the computer and frequency comparator for ultimate display in the output display 174, connected as shown by the cable 175 to the computer and frequency comparator 173.

For control of a vehicle or missile with respect to pitch, roll and yaw, the applicable phase of this form of the invention is as shown in FIG. 11. In a compact assembly four containment units 150a, 150b, 150c and 150d are mounted in pairs are fixed locations in an appropriate housing 180. Units 150a and 150b are at a set distance apart on an axis 181. Units 150c and 150d are at a set distance apart on an axis 182 perpendicular to the axis 181. The assembly is subject to movement in either or both of two paths, both perpendicular to the linear path of movement of the sensing masses when they are set in motion.

All four units are connected by respective cables 183, 184, 185 and 186 to the combined computer and frequency comparator 187, in turn interconnected with the output display 188 by a cable 189.

In operation a shift of the units 150a and 150b relative to each other along the axis of sensitivity 181 or 182 may, when the frequency of oscillation of the periodic motion in the units 150a and 150b are compared, be used to measure pitch.

A shift of the units 150c and 150d relative to each other along an axis perpendicular to the page on which FIG. 11 is depicted causes a variation in the frequency of oscillation of the periodic motion in the unit 150c relative to the unit 150d. The latter frequencies when compared by the computer and frequency comparator 187 may be used to measure roll. A comparator calculation of the frequencies of oscillation for pitch and for roll may be used to measure yaw of the vehicle or missile.

In the assembly of two pairs of units in the manner described where there is a variation in frequency of oscillation due to movement which generates a beat effect for each pair, the beat frequency of all four units can be made use of as a further refinement in the calculations and resultant determinations.

There has been provided as shown an instrument which is capable of performing the dual function of measuring accelerations relative to inertial space, simultaneously with the measurement of rotational translation, or roll, pitch, and yaw. It is capable of accurately measuring all six parameters simultaneously, or in any combination, by sensing variations in motion of a single, dynamically restrained, sensing mass. It is totally free from frictional effects and mechanical restraint error sources and is compact, rugged, and reliable.

There has also been provided a practical configuration for measurement of the gravity gradient along any coordinate axis without limitation as to inclination.

The result is a highly accurate inertial navigation or guidance system in which the actual variations in the acceleration due to gravity, along the path of motion of a vehicle, are made, as differentiated from the accelerations of the vehicle relative to inertial space, thereby eliminating the common error source of an unknown gravity function.

While particular embodiments of the present invention have been shown and described, it will be obvious to those skilled in the state of the art that changes and modifications may be made without departing from the invention in its broader aspects, and therefore, the aims of its appended claims is to cover all such changes and modifications as fall within the true spirit and scope of this invention.

Having described the invention, what is claimed as new in support of Letters Patent is as follows:

1. A sensing device comprising a housing providing a vacuum chamber, a plurality of electrodes in an array about said chamber, a sensing mass in said chamber, a source of electromagnetic radiation external to said housing providing a beam directed toward said sensing mass, means in the path of said beam for redirecting portions of said beam to the sensing mass along each of three coordinate axes passing through said chamber, admission means along each said axis located between the chamber and the exterior and in the path of the portion of said beam directed along each respective axis, an electric circuit including a detector for each axis having a field of view within said chamber, switch means and accompanying containment control means for said plurality of electrodes along the axis of each electrode, an electric power supply for said switch means and accompanying containment control means for said electrodes, and computerized detecting means defining a substantially spherical dynamic containment space for said mass within said array exceeding by many times the size of said mass and within the field of view of said detector including computerized electrical means having elements thereof interconnecting said switch means and accompanying containment control means together with each pair of electrodes with said power supply and the respective detector, each element of the computerized electrical means having an activating condition in response to movement of said sensing mass to a location at a preset distance from the center of said containment space whereby said condition in said computerized electrical means effects a responsive condition in said containment control means to energize the electrodes and substantially reverse the direction of movement of said sensing mass.

2. A sensing device as in claim 1 wherein said beam is a laser beam and said detectors are laser responsive detectors.

3. A sensing device as in claim 1 wherein there is an output display having an optically observable readout in operable association with said computerized detecting means.

4. A sensing device as in claim 1 wherein the electrical power supply is an A.C. power supply.

5. A sensing device as in claim 1 wherein the electrical power supply is a D.C. power supply.

6. A sensing device as in claim 1 wherein detectors comprise optical detectors in the form of Michelson interferometers and said admission means comprises an optical quality window for each detector.

7. A sensing device as in claim 2 wherein there is a single laser source, a single power supply and three detectors, one for each of three coordinate axes.

8. A sensing device as in claim 1 wherein the sensing mass is a retroreflector.

9. A sensing device as in claim 1 wherein the sensing mass is a charged particle.

10. A sensing device as in claim 1 wherein the sensing mass is a diamagentic particle and containment forces are electromagnetic.

11. A sensing device as in claim 1 wherein the electrode nearest the mass when the mass is at the perimeter of the containment spaces is activated with a pulse of the same sign as the charge on the mass whereby to repel the mass with an increment in momentum along the axis to which said last identified electrode is normal whereby to determine the direction of travel of the mass.

12. A sensing device as in claim 1 wherein there is an up-down counter clock in the computerized electrical means.

13. An instrument responsive to variations in gravitational effects comprising a plurality of sensing devices and means positioning said devices at a fixed distance from each other, each said device comprising a housing providing a vacuum chamber, a sensing mass in said chamber, a source of electromagnetic radiation external to said housing providing a beam directed toward said sensing device, a plurality of electrodes in a cubic array in said chamber, means in the path of said beam for directing portions of said beam to the sensing mass along each of three coordinate axes passing through said chamber, admission means along each said axis located between said chamber and the exterior and in the path of the portion of said beam directed along each respective axis, an electric circuit including a detector for each axis having a field of view within said chamber, containment electronic switch means along each axis, a common electric power supply and computerized electric means for said plurality of electrodes and said sensing devices having elements thereof interconnecting said computerized electrical means with said electrodes and with said power supply and the respective detector, said computerized electrical means defining a substantially spherical dynamic containment space for said mass within said array exceeding by a great many times the size of said mass and within the field of view of said detector, each element of the computerized electric means having an activating condition in response to movement of said sensing mass of the respective sensing device to a location at a preset distance from the center of said containment space whereby said condition effects a responsive condition in said switch means to substantially reverse the direction of movement of said sensing mass, and an output display responsive to the performance of both of said sensing masses.

14. A sensing device as in claim 1 wherein said sensing mass is a rotating charged mass and there is attitude check instrumentation comprising alignment coil means for said sensing mass along one of said coordinate axes, a source of power for energizing said alignment coil means and an electrical activating connection between said source of power and said computerized electrical means having a periodic energized cycle, and magnetometer sensing means along said one of said coordinate axes having an electrical connection to said computerized electrical means and responsive to orientation of said sensing mass when the orientation of said sensing mass is affected by action of said alignment coil means whereby to detect malfunction attitude of said sensing device.

15. A sensing device as in claim 14 wherein there is a spherical sensing space within said spherical dynamic containment space subject to establishment by said computerized electrical means, the cycle of said source of power being periodically initiated when said sensing mass is adjacent the circumference of the spherical sensing space.

16. A sensing device as in claim 15 wherein the diameter of said spherical sensing space is no less than about ten percent smaller than the diameter of said spherical dynamic containment space.

17. A sensing device as in claim 14 wherein said power means is a D.C. power means.

18. A sensing device as in claim 14 wherein said alignment means comprises a pair of coils located one adjacent each electrode along said one coordinate axis, and a single power supply for said coils.

19. A sensing mass as in claim 14 wherein there is a plurality of alignment means and accompanying magnetometer sensing means mass along respective different coordinate axes.

20. A sensing device comprising means providing a vacuum chamber, a plurality of electrodes in an array about said chamber with pairs of electrodes oppositely positioned, a sensing mass in said chamber, a source of electromagnetic radiation providing a beam directed toward said sensing mass, means in the path of said beam for redirecting portions of said beam to the sensing mass along each of three coordinate axes passing through pairs of oppositely positioned electrodes, admission means located between the chamber and the exterior, an electric circuit including a detector for each axis having a field of sensitivity within said chamber, switch means and accompanying containment control means for said plurality of electrodes along the axis of each pair of electrodes, an electric power supply for said switch means and accompanying containment control means for said electrodes, and computerized detecting means defining substantially dynamic containment opposite limits of action for said mass within said array exceeding by many times the size of said mass and within the field of sensitivity of said detector including computerized electrical means having elements thereof interconnecting said switch means and accompanying containment control means together with each pair of electrodes with said power supply and the respective detector, each element of the computerized electrical means having an activating condition in response to movement of said sensing mass to a location at a preset distance with respect to said opposite limits of action whereby said condition in said computerized electical means effects a responsive condition in said containment control means to energize the electrodes and substantially change the direction of movement of said sensing mass.

21. A sensing device according to claim 20 wherein the sensing mass follows a sequential pattern of movement comprising reciprocating movement in line with a first coordinate axis extending through one pair of oppositely positioned electrodes followed by reciprocating movement in line with a second coordinate axis extending through a second pair of oppositely positioned electrodes.

22. A sensing device according to claim 21 wherein the sensing mass after movement in line with the second coordinate axis moves in a reciprocating direction in line along a third coordinate axis extending through a third pair of oppositely positioned electrodes.

23. A sensing device according to claim 22 wherein the sensing mass returns to a central position before each change in direction from one coordinate axis to another.

24. A sensing device according to claim 23 wherein movement of the sensing mass along each of said coordinate axes is for a substantially equal length of time.

25. A sensing mass according to claim 22 wherein said sensing mass is a rotating charged mass and there is attitude check instrumentation comprising alignment coil means along one of said coordinate axes, a source of power for energizing said alignment coil means and an electrical activating connection between said source of power and said computerized electrical means having a periodic energized cycle, and magnetometer sensing means along said one of said coordinate axes having an electrical connection to said computerized electrical means and responsive to orientation of said sensing mass when the orientation of said sensing mass is affected by action of said alignment coil means whereby to detect malfunction attitude of said sensing device.

26. A sensing device comprising a containment unit, a power supply and containment electronics in electric communication with said containment unit and a computer and output display means in electric communication with said containment unit, said containment unit comprising a series of three pairs of electrodes in a cubic array, a housing surrounding said electrodes and providing a vacuum chamber therefor, and a sensing mass within said cubic array, said containment unit comprising a first means adapted to provide an A.C. charge on said cubic array adapted to set said mass in stable equilibrium, a second means adapted to apply a pulsating D.C. or sinusoidal voltage of a pair of said electrodes whereby to produce a constant linear reciprocation motion in said mass for a limited distance along an oscillating axis extending between said pair of electrodes, said mass being subject to displacement along an axis of sensitivity transverse to said oscillating axis whereby to vary the frequency of oscillation of periodic motion of said mass, said computer and output display means having means for showing the character of said displacement.

27. A sensing device as in claim 26 wherein there is a second containment unit and mounting means positioning said containment units at a fixed predetermined distance apart along an axis substantially parallel to said linear reciprocating motion, said computer and output display means including frequency comparator means for showing the affects of motion of one of said container units relative to the other.

28. A sensing device as in claim 26 wherein there are four containment units and mounting means positioning said containment units in the same plane arranged in two pairs, a mounting axis between one of said pairs being perpendicular to a mounting axis between the other of said pairs, one of said mounting axes being substantially parallel to and the other of said mounting axes being substantially perpendicular to said linear reciprocating motion, said computer and output display means including frequency comparator means for showing the affects of motion of containment units of said pairs relative to each other and the affects of motion of one of said pairs of units relative to the other of said pairs of units.

* * * * *